(12) United States Patent
Miyashita et al.

(10) Patent No.: US 9,218,027 B2
(45) Date of Patent: Dec. 22, 2015

(54) INFORMATION PROCESSING APPARATUS, INFORMATION PROCESSING METHOD AND PROGRAM

(75) Inventors: Ken Miyashita, Tokyo (JP); Shunichi Kasahara, Kanagawa (JP); Ikuo Yamano, Tokyo (JP); Kazuyuki Yamamoto, Kanagawa (JP); Hiroyuki Mizunuma, Tokyo (JP)

(73) Assignee: Sony Corporation, Tokyo (JP)

( * ) Notice: Subject to any disclaimer, the term of this patent is extended or adjusted under 35 U.S.C. 154(b) by 748 days.

(21) Appl. No.: 13/196,346

(22) Filed: Aug. 2, 2011

(65) Prior Publication Data

US 2012/0038542 A1  Feb. 16, 2012

(30) Foreign Application Priority Data

Aug. 16, 2010  (JP) ................ P2010-181759

(51) Int. Cl.
| | |
|---|---|
| G09G 5/00 | (2006.01) |
| G06F 1/16 | (2006.01) |
| G06F 3/038 | (2013.01) |
| G06F 3/042 | (2006.01) |
| G06F 3/0485 | (2013.01) |
| G06F 3/0486 | (2013.01) |
| G06F 3/0488 | (2013.01) |
| H04M 1/725 | (2006.01) |

(52) U.S. Cl.
CPC ............ *G06F 1/1639* (2013.01); *G06F 1/1626* (2013.01); *G06F 1/1643* (2013.01); *G06F 1/1647* (2013.01); *G06F 1/1673* (2013.01); *G06F 3/038* (2013.01); *G06F 3/0425* (2013.01); *G06F 3/0426* (2013.01); *G06F 3/0485* (2013.01); *G06F 3/0486* (2013.01); *G06F 3/04883* (2013.01); *G06F 3/04886* (2013.01); *H04M 1/72519* (2013.01); *G06F 2203/0381* (2013.01); *H04M 2250/52* (2013.01); *H04M 2250/54* (2013.01)

(58) Field of Classification Search
USPC ......................................... 345/168; 715/864
See application file for complete search history.

(56) References Cited

U.S. PATENT DOCUMENTS

| | | | |
|---|---|---|---|
| 7,612,785 B2 * | 11/2009 | Ueda et al. ................ 345/619 |
| 2001/0011998 A1 * | 8/2001 | Agata et al. ............... 345/168 |
| 2003/0132921 A1 * | 7/2003 | Torunoglu et al. ......... 345/173 |
| 2004/0046744 A1 * | 3/2004 | Rafii et al. ................ 345/168 |

(Continued)

FOREIGN PATENT DOCUMENTS

| | | |
|---|---|---|
| JP | 2009-64375 | 3/2009 |
| WO | WO 2011119483 A1 * | 3/2011 |

*Primary Examiner* — Charles Hicks
*Assistant Examiner* — Jeffrey Steinberg
(74) *Attorney, Agent, or Firm* — Paratus Law Group, PLLC

(57) ABSTRACT

An apparatus and method provide logic for processing information. In one implementation, an information processing device includes a housing and a display unit configured to display at least a portion of a first content to a user. A projection unit is configured to project at least a portion of a second content onto a projection surface. A detection unit configured to detect a displacement between the projection surface and a portion of the housing, the housing being configured to support the display unit, the projection unit, and the detection unit. The detection unit is further configured to determine whether the displacement falls within a threshold distance. The projection unit is further configured to project the second portion of the content onto the projection surface, when the displacement falls within the threshold distance.

22 Claims, 14 Drawing Sheets

(56) References Cited

U.S. PATENT DOCUMENTS

| | | | |
|---|---|---|---|
| 2005/0012721 A1* | 1/2005 | Fong et al. | 345/170 |
| 2006/0209020 A1* | 9/2006 | Scheiblhuber | 345/156 |
| 2009/0284462 A1* | 11/2009 | Chen et al. | 345/156 |
| 2010/0085274 A1* | 4/2010 | Kilpatrick et al. | 345/1.3 |
| 2010/0161839 A1* | 6/2010 | Fontana et al. | 710/10 |
| 2010/0197354 A1* | 8/2010 | Lee et al. | 455/566 |
| 2010/0197364 A1* | 8/2010 | Lee | H04M 1/72533 455/572 |
| 2010/0247223 A1* | 9/2010 | Ribi | 401/195 |
| 2012/0034953 A1* | 2/2012 | Chowdary | 455/566 |

\* cited by examiner

FIG. 12
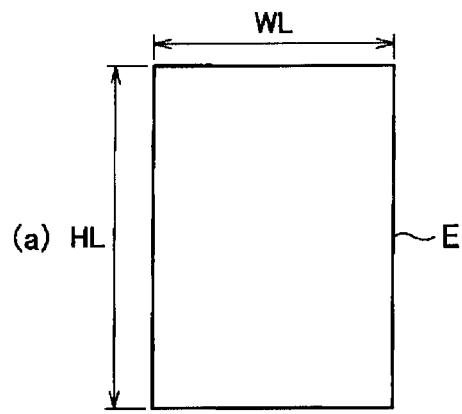
(a)
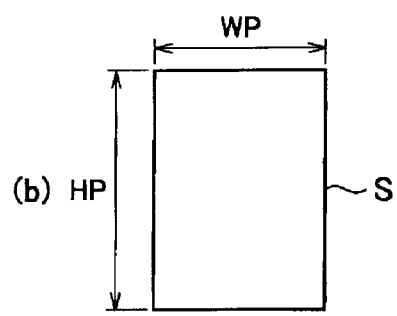
(b)
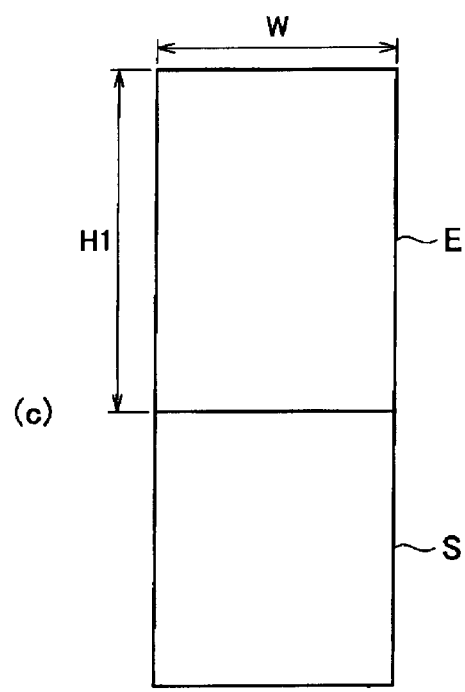
(c)

INFORMATION PROCESSING APPARATUS, INFORMATION PROCESSING METHOD AND PROGRAM

CROSS-REFERENCE TO RELATED APPLICATIONS

This application is based upon and claims the benefit of priority from Japanese Patent Application JP 2010-181759, filed Aug. 16, 2010, the entire contents of which are incorporated herein by reference.

BACKGROUND

1. Technical Field

The disclosed exemplary embodiments relate to an information processing apparatus, an information processing method, and a program.

2. Description of Related Art

An information processing apparatus is provided in a display apparatus. This display apparatus has a display unit, and displays various images. Further, from the viewpoint that the display apparatus enlarges and displays images, a projector is known which projects and displays an image on a projection surface (see Japanese Patent Application Laid-Open No. 2009-64375). The projector of Japanese Patent Application Laid-Open No. 2009-64375 overlays a keyboard video image on a monitor video image of a personal computer based on a video signal output from a personal computer, and projects the video image on a floor surface.

SUMMARY

By the way, some display apparatuses have both of a display unit and a projector. However, these display apparatuses are intended for use to display images on the display unit or project images on the projection surface to display. Therefore, using images displayed on the display unit and images projected on the projection surface together is not taken into account, and there is an issue that the display unit and the projecting unit are not effectively utilized.

In light of the foregoing, it is desirable to provide a novel and improved information processing apparatus, information processing method and program capable of improving convenience utilizing an image to be displayed on the display unit and an image to be projected on the projection surface.

Consistent with an exemplary embodiment, an information processing device includes a housing and a display unit configured to display at least a portion of a first content to a user. A projection unit is configured to project at least a portion of a second content onto a projection surface. A detection unit configured to detect a displacement between the projection surface and a portion of the housing, the housing being configured to support the display unit, the projection unit, and the detection unit. The detection unit is further configured to determine whether the displacement falls within a threshold distance. The projection unit is further configured to project the second portion of the content onto the projection surface, when the displacement falls within the threshold distance.

Consistent with an additional exemplary embodiment, a computer-implemented method for processing information includes detecting a displacement between a projection surface and a portion of a housing of an information processing device. The method determines whether the displacement falls within a threshold distance. At least a portion of a first content is displayed to a user. At least a portion of a second content is projected onto a projection surface, when the displacement falls within the threshold distance.

Consistent with a further exemplary embodiment, a non transitory, computer-readable storage medium stores a program that, when executed by a processor, causes the processor to perform a method for processing information. The method includes detecting a displacement between a projection surface and a portion of a housing of an information processing device. The method determines whether the displacement falls within a threshold distance. At least a portion of a first content is displayed to a user. At least a portion of a second content is projected onto a projection surface, when the displacement falls within the threshold distance.

As described above, according to the disclosed exemplary embodiments, it is possible to improve convenience utilizing an image to be displayed on a display unit and an image to be projected on a projection surface.

BRIEF DESCRIPTION OF THE DRAWINGS

FIG. 12 is a schematic diagram for explaining integrated coordinate space when a display screen and projection surface of the display unit 16 are regarded as a continuous display area;

DETAILED DESCRIPTION OF THE EXEMPLARY EMBODIMENTS

Figure 1:
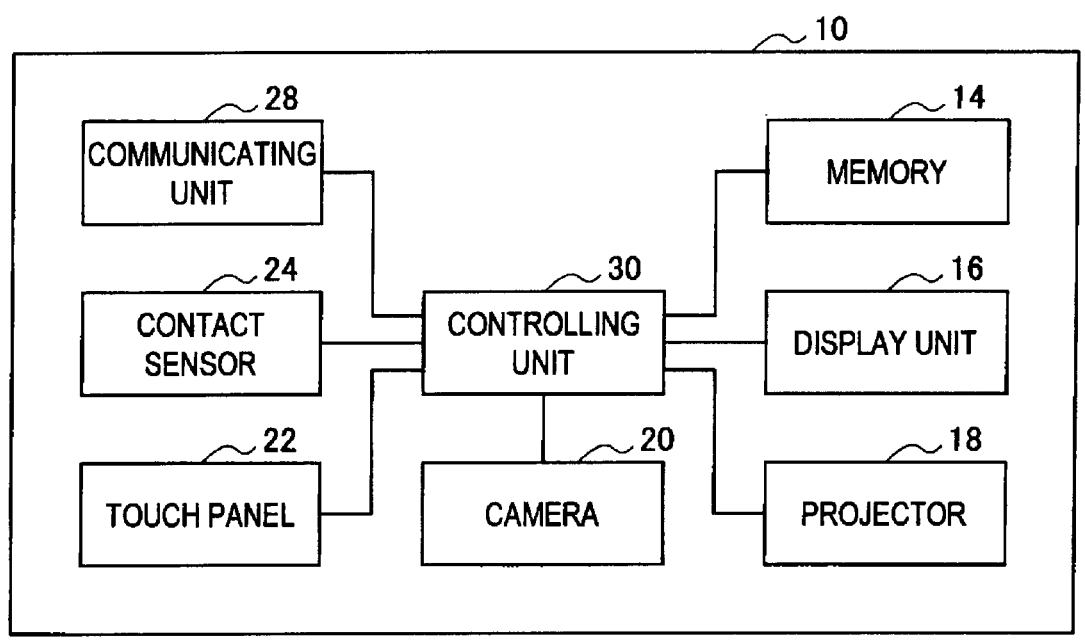
FIG. 1 is a block diagram showing a configuration of main parts of a mobile terminal 10.

Hereinafter, preferred exemplary embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below:
1. Configuration of information processing apparatus.
2. Projection of projection image by projector 18.
3. Mode of projection image to be projected on projection surface S.
4. Scroll display of image P1 and projection image P2.
5. First exemplary embodiment of display processing of image P1 and projection image P2.
6. Second exemplary embodiment of display processing of image P1 and projection image P2.
7. Example of scroll display of image P1 and projection image P2.
8. Other exemplary embodiments.

1. Configuration of Information Processing Apparatus

In the present exemplary embodiment, a mobile terminal such as a mobile phone or PDA (Personal Digital Assistant) will be explained as an example of an information processing apparatus.

Figure 2:
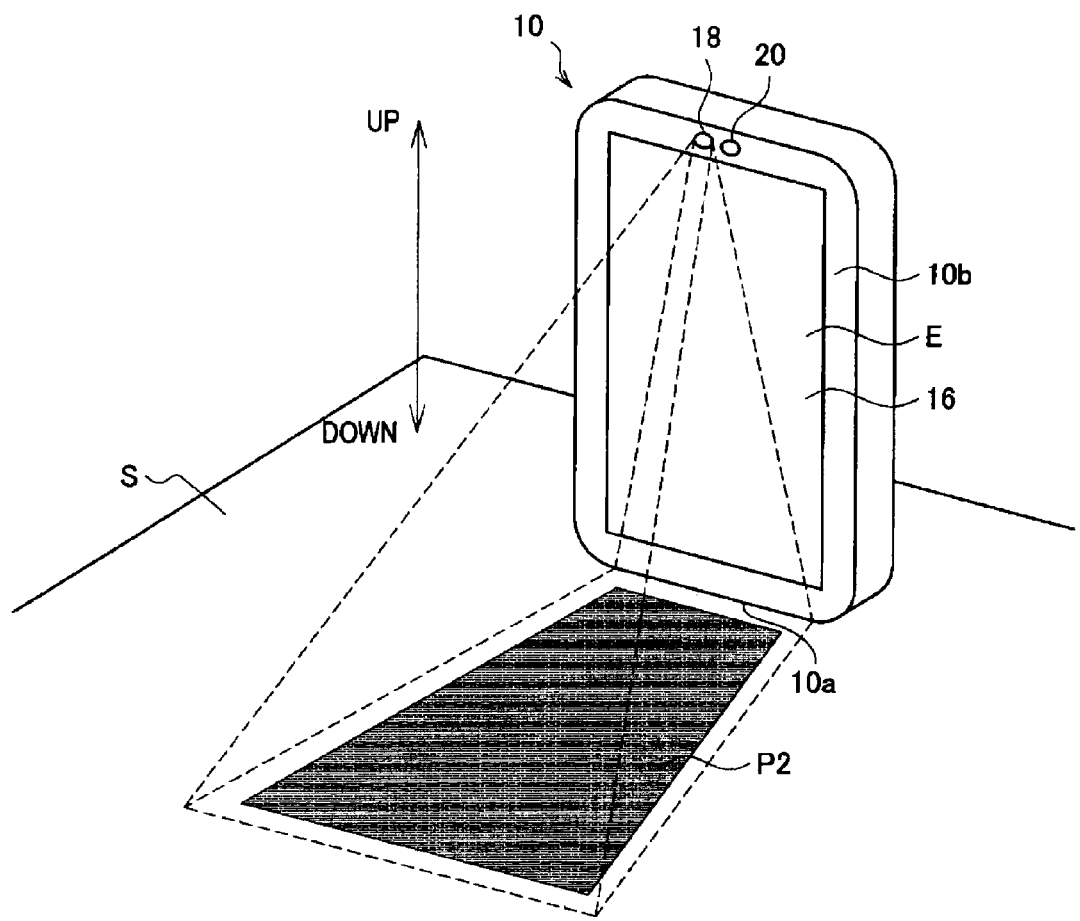
FIG. 2 is a perspective view showing an outer appearance of the mobile terminal 10.

First, a configuration of a mobile terminal 10 will be explained using FIGS. 1 and 2. FIG. 1 is a block diagram showing a configuration of main parts of the mobile terminal 10. FIG. 2 is a perspective view showing an outer appearance of the mobile terminal 10. In addition, FIG. 2 shows how a projection image is projected on a table (not shown) by a projector 18 of the mobile terminal 10.

The mobile terminal 10 has, for example, a function of browsing a Web (World Wide Web) site. As illustrated in FIG. 1, this mobile terminal 10 has a controlling unit 30, a memory 14, a display unit 16, the projector 18 which is an example of a projecting unit, a camera 20, a touch panel 22, a contact sensor 24 which is an example of a contact detecting unit, and a communicating unit 28.

The controlling unit 30 controls the entire mobile terminal 10, and performs predetermined control for the display unit 16, the projector 18 and the like. The memory 14 stores information (for example, program information executed by the controlling unit 30) used in the controlling unit 30.

The display unit 16 is, for example, a liquid crystal display or an organic EL display, and displays, for example, various images on the display screen. For example, the display unit 16 displays an image of a Web page upon browsing of a Web site. Further, the display unit 16 is provided in a front surface 10b of the mobile terminal 10, and the size of the display screen of the display unit 16 is much smaller than the area of the front surface 10b.

As illustrated in FIG. 2, the projector 18 projects a projection image (second image) on the projection surface S. The projector 18 has a light source and an optical system such as a lens, and emits a beam of light and projects an image or texts (video image) on the projection surface. The projector 18 is also provided in the front surface 10b of the mobile terminal 10 similar to the display unit 16, and is positioned above the display unit 16 in the up and down direction. Further, the projector 18 is configured to project a projection image obliquely downward in the up and down direction.

Further, the projector 18 according to the present exemplary embodiment projects a projection image on a contact surface (projection surface S) which a bottom surface 10a of the mobile terminal 10 contacts. As illustrated in FIG. 2, the projector 18 projects a projection image such that the projection image is adjacent to the bottom surface 10a of the mobile terminal 10. In addition, the details of projection of a projection image by the projector 18 will be explained below.

The camera 20 is directed to taking images. The camera 20 has a lens and an imaging element such as a CCD or CMOS. The camera 20 according to the present exemplary embodiment has a function of detecting movement of the user's finger on a projection image projected on the projection surface S. To realize this function, the camera 20 is also provided in the front surface 10b of the mobile terminal 10, and is positioned above the display unit 16 in the up and down direction similar to the projector 18. Then, the camera 20 is configured to take an image in an obliquely lower part in the up and down direction. In addition, in the present exemplary embodiment, the camera 20 is provided next to the projector 18 in the horizontal direction.

A touch panel 22 is overlaid on and provided in the display unit 16. This touch panel 22 allows detection of a user's tap operation or drag operation on an image displayed on the display unit 16. Here, one of a so-called electrostatic method and pressure-sensitive method can be adopted as a detection method of the touch panel 22. In addition, the tap operation means touch control with respect to the touch panel 22, and the drag operation means the operation of moving the finger contacting the touch panel 22.

A contact sensor 24 is provided in the bottom surface 10a of the mobile terminal 10 and detects that the mobile terminal 10 contacts the projection surface S. As long as the contact sensor 24 can detect the contact surface, sensors of various systems such as a mechanical system can be used.

The communicating unit 28 has an antenna, and performs wireless communication with a network through, for example, a base station to connect to an external server or the like.

In addition, although the projector 18 and the camera 20 are positioned above the display unit 16 in the up and down direction above, they are not limited to this. For example, the projector 18 and the camera 20 may also be positioned on the lateral side of the display unit 16 in the horizontal direction. Further, the projector 18 and the camera 20 may be provided in respectively different positions.

2. Projection of Projection Image by Projector 18

As illustrated in FIG. 2, the projector 18 projects a projection image on a contact surface (projection surface S) which the bottom surface 10a of the mobile terminal 10 contacts. In addition, the dotted line on the projection surface S indicates a projection area of the projector 18.

In the present exemplary embodiment, display of an image by the display unit 16 and projection of an image on the projection surface by the projector 18 are both performed. Further, the image displayed on the display unit 16 and the projection image projected by the projector 18 form a series of seemingly continuous images. Here, the projection image is related to an image displayed on the display unit 16. As a result, the display area seemingly expands, so that the user can recognize the related image (continuous image) on a wide display screen.

The controlling unit 30 controls display of the image by the display unit 16 and projection of the image by the projector 18 to display these continuous images. That is, when the mobile terminal 10 contacts the projection surface S, the controlling unit 30 controls the display unit 16 and the projector 18 to display the image to be displayed on the display unit 16 and the projection image to be projected on the projection surface S as a series of continuous images.

More specifically, when detecting by means of the contact sensor 24 that the bottom surface 10a of the mobile terminal 10 contacts the contact surface (projection surface S) while the display unit 16 displays the image, the controlling unit 30 has the projector 18 project the projection image on the projection surface S. In addition, display processing of these continuous images will be described below.

Further, as will be explained below, to display continuous images, the controlling unit 30 controls the projector 18 to gradually expand the display area of the projection image to be projected.

3. Mode of Projection Image to be Projected on Projection Surface S

Figure 3:
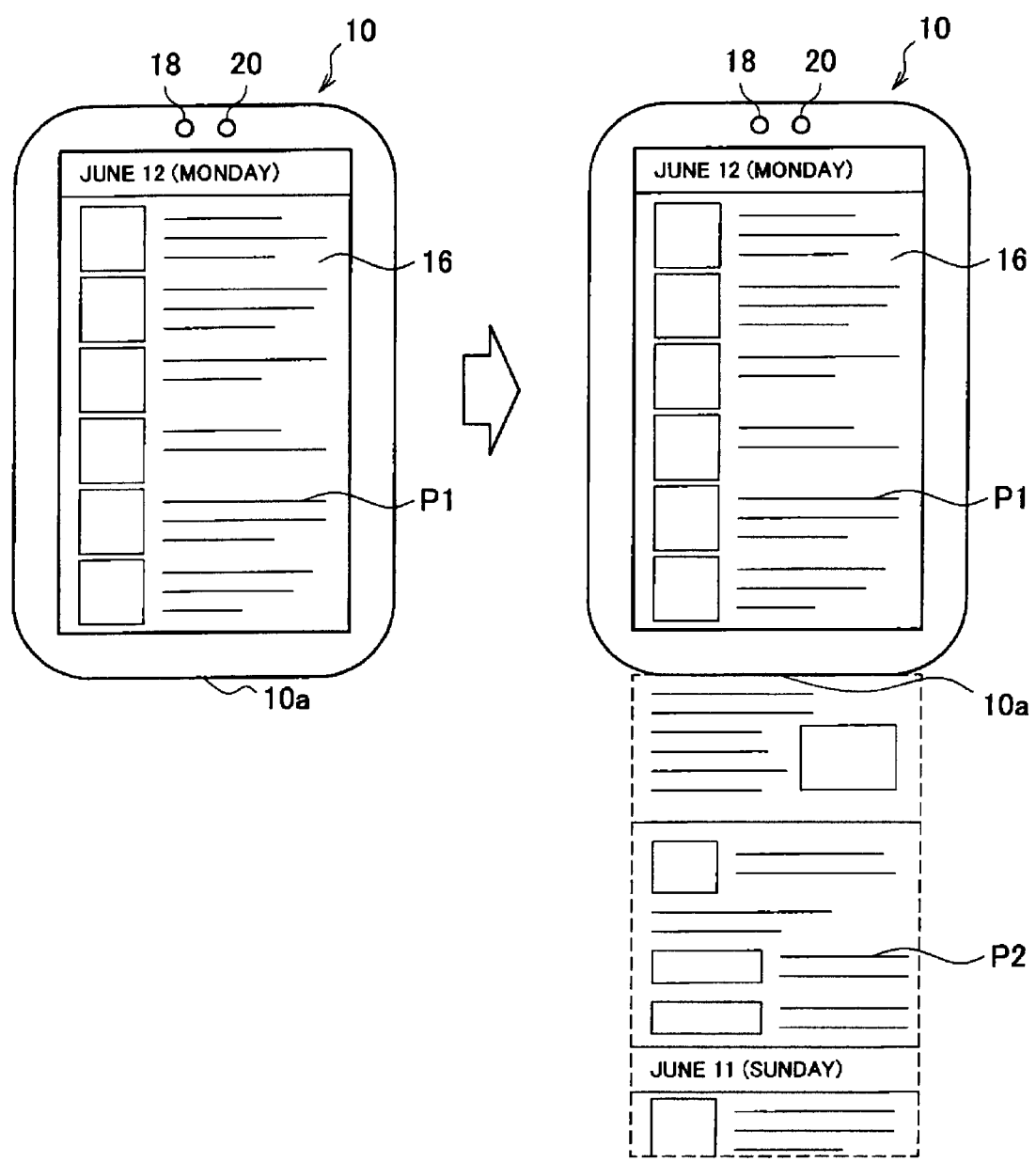
FIG. 3 is a view for explaining a projection image to be projected on the projection surface S when a Web page is displayed on the display unit 16.

Mode of a projection image to be projected on the projection surface S will be explained using FIGS. 3 and 4. FIG. 3 is a view for explaining a projection image to be projected on the projection surface S when a Web page is displayed on the display unit 16. In addition, for ease of explanation, in FIG. 3, the projection image is shown below the mobile terminal 10.

In FIG. 3, the size of the image of the Web page of the display target of the display unit 16 is greater than the size of the display screen of the display unit 16. Hence, the display unit 16 displays only the image P1 which is part of the Web page. Then, the image of the Web page which is not displayed on the display unit 16 is projected on the projection surface S by the projector 18 as the projection image P2. More specifically, the image P2 of the Web page continuing to the image P1 displayed on the display unit 16 (that is, the image P2 related to the image P1 displayed on the display unit 16) is projected on the projection surface S. In addition, in FIG. 3, the image P1 corresponds to the first image, and the projection image P2 corresponds to the second image.

Here, as is clear from FIGS. 2 and 3, the position of the projection image P2 on the projection surface S is adjacent to the bottom surface 10a of the mobile terminal 10. Further, as described above, the display screen of the display unit 16 is provided substantially over the entire area of the front surface 10b of the mobile terminal 10. Hence, discontinuity between the image P1 displayed on the display unit 16 and the projection image P2 on the projection surface S is little, so that the user can recognize the image P1 and the projection image P2 as continuous images.

As described above, the image P1 displayed on the display unit 16 and the projection image P2 projected on the projection surface S form a series of continuous images of the Web page. By looking at the image displayed on the display unit 16 and the image P2 projected on the projection surface S, the user can browse the Web page in a large screen size. Hence, for example, an operation of switching the display screen is not necessary, so that convenience of the mobile terminal 10 improves.

Figure 4:
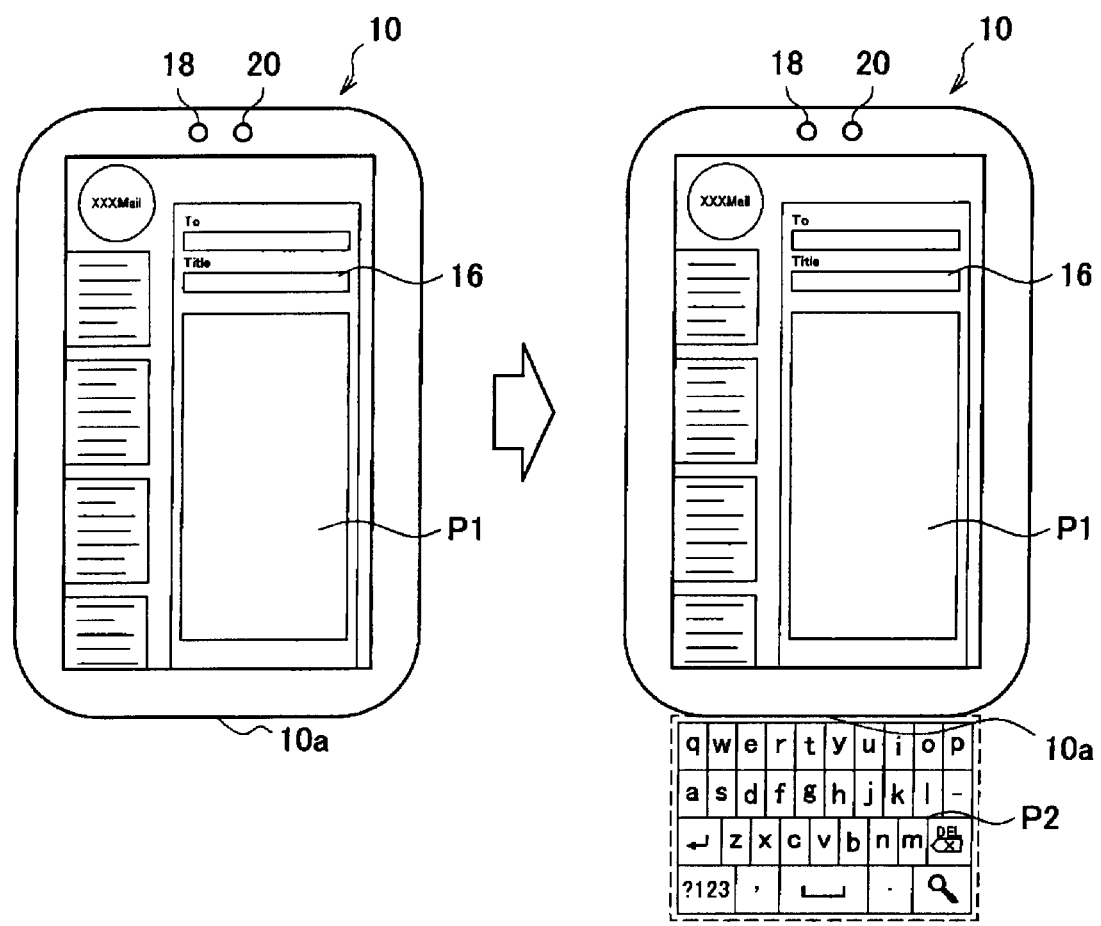
FIG. 4 is a view for explaining a projection image to be projected on a projection surface S when a text display area is displayed on a display unit 16.

FIG. 4 is a view for explaining a projection image to be projected on the projection surface S when a text display area is displayed on the display unit 16. In addition, for ease of explanation, FIG. 4 shows the projection image below the mobile terminal 10.

In FIG. 4, when the image P1 showing the text display area is displayed on the display unit 16, the image P2 showing the virtual keyboard for inputting texts in the text display area is projected on the projection surface S which the bottom surface 10a of the mobile terminal 10 contacts. By detecting touch control on the image P2 of this virtual keyboard, the mobile terminal 10 displays the text associated with the key touch-controlled on the text display area. Consequently, while looking at the screen displayed on the display unit 16, the user can easily input texts on the text display area by performing touch control on the projection image P2.

In addition, the projection image P2 projected on the projection surface S is not limited to the images shown in FIGS. 3 and 4, and any projection images are possible as long as the images are related to images to be displayed on the display unit 16.

4. Scroll Display of Image P1 and Projection Image P2

As described above, the controlling unit 30 controls the display unit 16 and the projector 18 to display a series of continuous images of the image P1 and the projection image P2. Further, in the present exemplary embodiment, to perform scroll display of the displayed continuous images, the controlling unit 30 also controls the display unit 16 and the projector 18.

When detecting a drag operation on the touch panel 22 or movement of the user's finger on the projection image P2 in a state where the image P1 is displayed on the display unit 16 and the projection image P2 is projected on the projection surface S, the controlling unit 30 performs scroll display of the image P1 and the projection image P2. Upon this scroll display, the image P1 to be displayed on the display unit 16 is scrolled and, at the same time, the projection image P2 to be projected on the projection surface S is also scrolled.

More specifically, when detecting a user's drag operation on the touch panel 22 while displaying continuous images, the controlling unit 30 scrolls the image P1 and the projection image P2 at the same time according to the amount of drag of the drag operation. Further, when the camera 20 detects movement of the user's finger while displaying continuous images, the controlling unit 30 scrolls the image P1 and the projection image P2 according to the amount of finger's movement. In addition, an example of scroll display of the image P1 and the projection image P2 will be described below.

5. First Exemplary Embodiment of Display Processing of Image P1 and Projection Image P2

Figure 5:
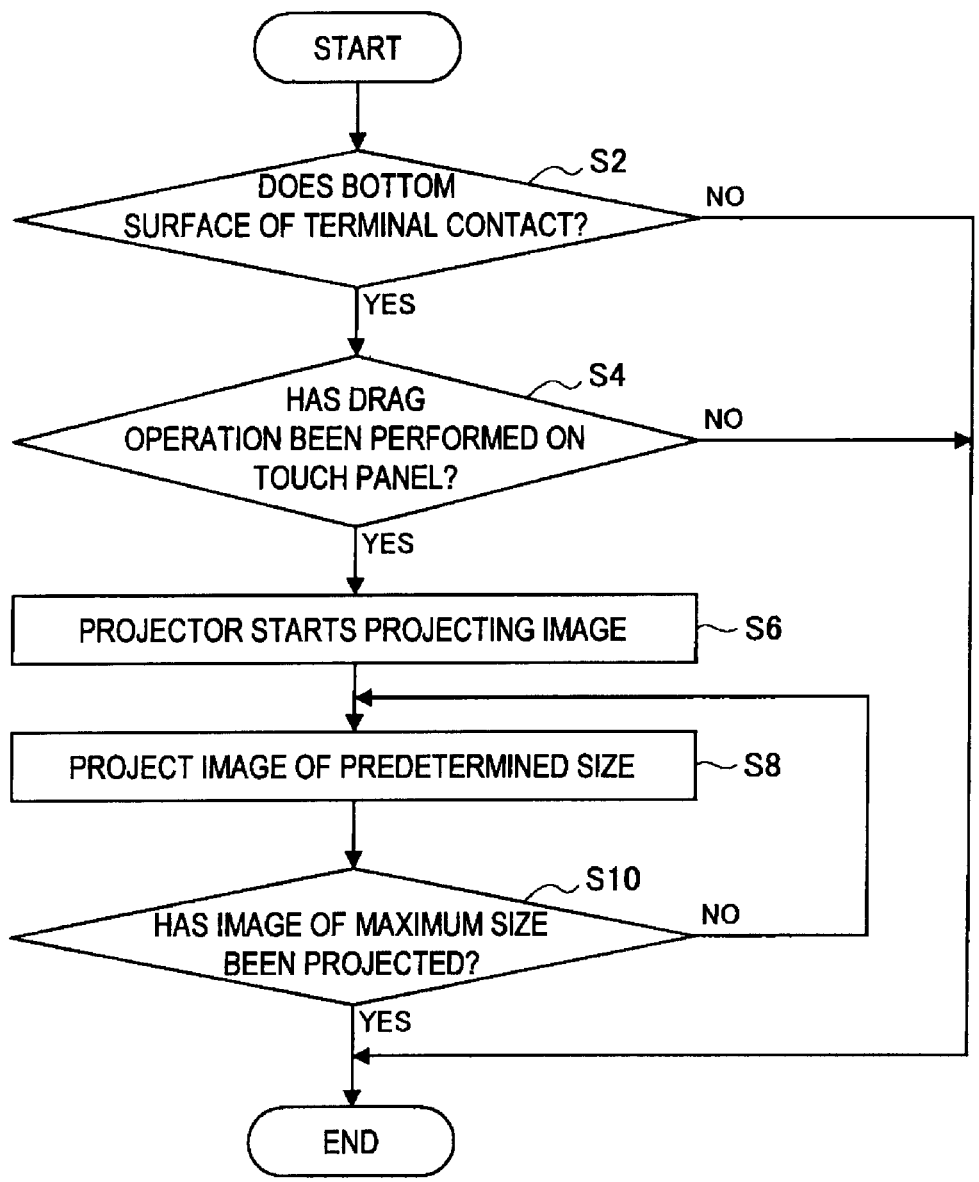
FIG. 5 is a flowchart for explaining a first exemplary embodiment of display processing of an image P1 and a projection image P2.

The first exemplary embodiment of display processing of the image P1 and the projection image P2 will be described using FIG. 5. FIG. 5 is a flowchart for explaining the first exemplary embodiment of display processing of the image P1 and the projection image P2.

The first exemplary embodiment relates to display processing when a Web page is displayed on the display unit 16 as the image P1 as shown in FIG. 3. Further, display processing according to the first exemplary embodiment is started in a state where the Web page (image P1) is displayed on the display unit 16 and the projector 18 does not perform projection. Here, although the Web will be explained as an example, the present disclosure is not limited to this.

First, by means of the contact sensor 24, the controlling unit 30 decides whether or not the bottom surface 10a of the mobile terminal 10 contacts another object (here, the table T as an example) (step S2). Here, how the contact sensor 24 detects the table T will be explained using FIG. 6.

Figure 6:
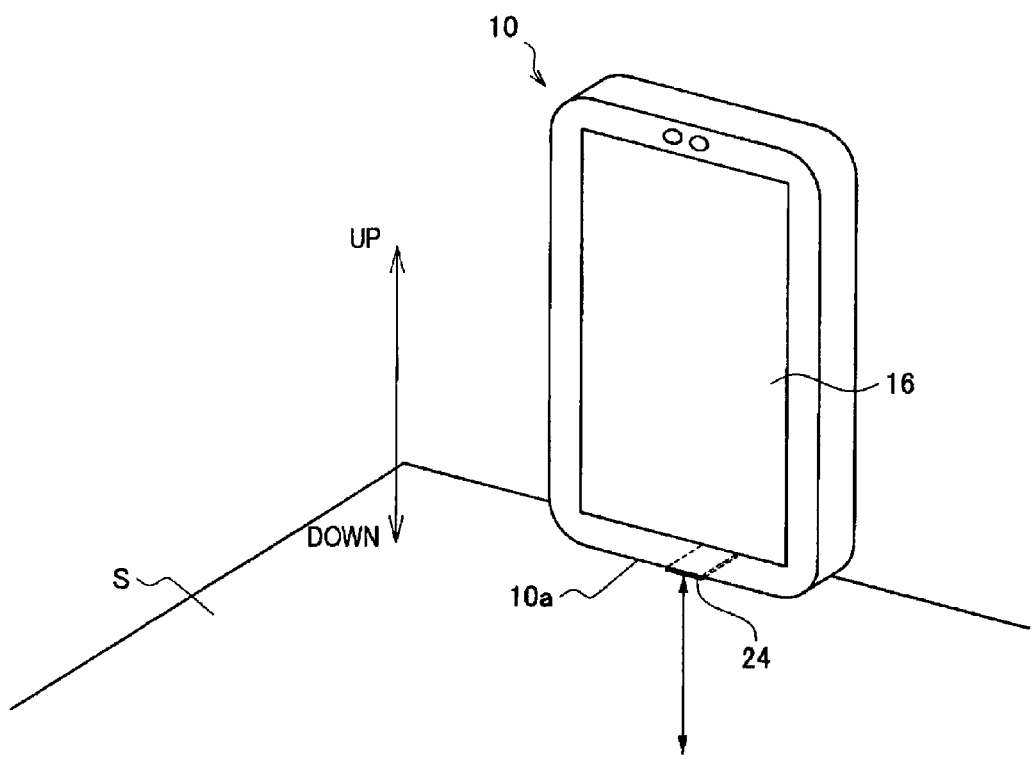
FIG. 6 is a view for explaining that a contact sensor 24 detects contact of a table.

FIG. 6 is a view for explaining that the contact sensor 24 detects contact of the table T. In addition, for ease of explanation, in FIG. 6, the image P1 is not displayed on the display unit 16. The contact sensor 24 provided in the bottom surface 10a of the mobile terminal 10 detects contact when the bottom surface 10a contacts the table T in a state where the mobile terminal 10 is substantially vertical with respect to the table T. Therefore, when the mobile terminal 10 is positioned obliquely with respect to the table T, the contact sensor 24 does not detect the table T.

Back to the flowchart shown in FIG. 5, explanation of display processing will continue. When the controlling unit 30 decides through the contact sensor 24 that the bottom surface 10a does not contact the table T (step S2: No), that is, when the mobile terminal 10 is positioned apart from the table T, the projector 18 does not project the projection image P2 on the projection surface S. That is, the display unit 16 alone displays the Web page.

By contrast with this, when deciding by means of the contact sensor 24 that the bottom surface 10a contacts the table T (step S2: Yes), the controlling unit 30 subsequently decides whether or not the user's finger performs a drag operation in a vertical direction on the touch panel 22 (step S4). This drag operation is performed by the user in order to expand the display area of the Web page.

Further, when the controlling unit 30 decides that a drag operation is not performed on the touch panel 22 (step S4: No), the projector 18 does not project the projection image P2 on the projection surface S. That is, the display unit 16 alone displays the Web page.

By contrast with this, when deciding that the drag operation is performed (step S4: Yes), the controlling unit 30 causes the projector 18 to start projecting the projection image P2 on the contact surface (that is, the projection surface S) through which the table T contacts the bottom surface 10a (step S6). The projector 18 starts projecting the projection image P2 on the projection surface S such that the projection image P2 is adjacent to the bottom surface 10a.

Here, the projection image P2 is an image of the Web page which is not displayed on the display unit 16. The image P1 on the display unit 16 and the projection image P2 on the projection surface S are images (a series of continuous images) forming one Web page.

Figure 7:
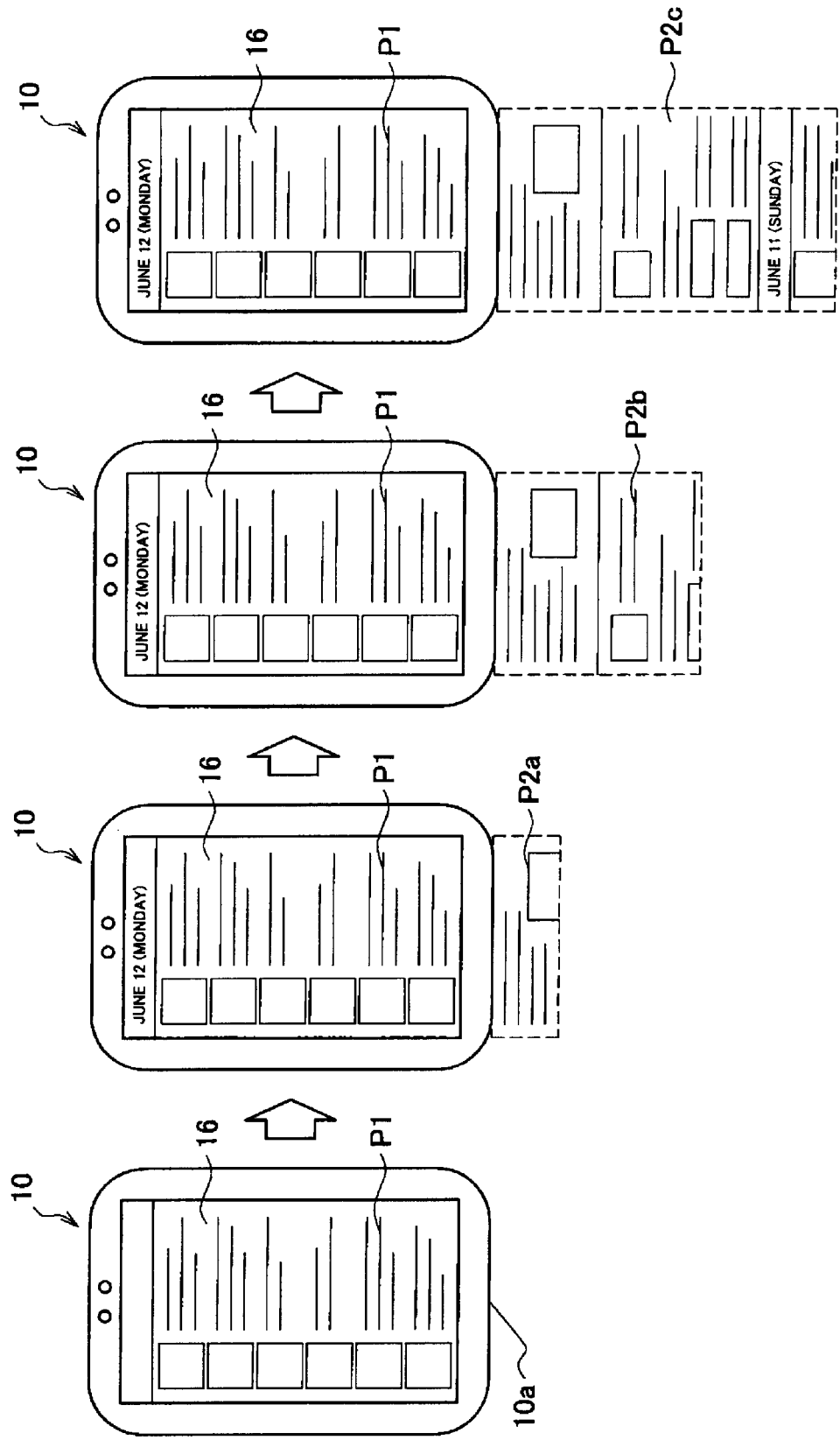
FIG. 7 is a view for explaining a mode where a projector 18 gradually enlarges and projects a projection area on the projection surface S.

Meanwhile, in the present exemplary embodiment, the projector 18 does not instantly project the projection image P2 shown in FIG. 3. As shown in FIG. 7, the projector 18 projects a projection image such that the projection area expands with the lapse of time.

FIG. 7 is a view for explaining a mode where the projector 18 gradually expands and projects the projection area on the projection surface S. In FIG. 7, the projection area of the projection image P2 is expanded at three stages. That is, the projector 18 first projects a projection image P2a on the projection surface S such that the projection image P2a pops out from the bottom surface 10a. Further, after maintaining the state where the projection image P2a is projected only for a certain time, the projector 18 projects a projection image P2b on the projection surface S. Furthermore, after maintaining the state where the projection image P2b is projected only for a certain time, the projector 18 projects a projection image P2c on the projection surface S. This projection image P2c has a maximum size which can be projected (the same size as the image shown in FIG. 3).

Thus, by gradually expanding the projection area of the projection image P2 on the projection surface S, the user can easily recognize that the image forming part of the continuous images is displayed on the projection surface S.

Back to the flowchart shown in FIG. 5, explanation of display processing of projecting the three projection images P2a to P2c shown in FIG. 7 will be continued. First, the controlling unit 30 controls the projector 18 such that the projection image P2a (image of a predetermined size) extends from the bottom surface 10a of the mobile terminal 10 in a state where the image P1 is displayed on the display unit 16 (step S8).

Next, the controlling unit 30 decides whether or not the image projected on the projection surface S is the projection image P2c of the maximum size (step S10). Here, the projection image P2a is projected (step S10: No), and therefore the controlling unit 30 performs step S8 again and projects the projection image P2b. In addition, to expand the projection image P2a to the projection image P2b, the projected state of the image is maintained. Thus, the controlling unit 30 repeats processing of step S8 and step S10 until the projection image of the maximum size is projected.

Further, when the projection image P2c is projected (step S10: Yes), the controlling unit 30 finishes processing. According to this display processing, one large display area is formed by projecting from the projector 18 the projection image P2 related to the image P1 on the projection surface S while the display unit 16 displays the image P1. Therefore, compared to when the user looks at the image displayed on one of the display screen and the projection surface S, the user can browse the Web page in a large screen size, so that a complicated operation such as switching of the display screen is not necessary and convenience of the mobile terminal 10 improves.

Further, by executing the above display processing, the display screen and the projection surface S of the display unit 16 are arranged to be adjacent, so that the display screen and the projection surface S can be handled as one display area. Consequently, the images P1 and P2 forming the Web page respectively on the display screen and the projection surface S can be displayed as a series of continuous images. As a result, compared to when the user looks at the image displayed on one of the display screen and the projection surface S, the user can recognize the image in a wide range, so that convenience for the user improves.

In the past, an apparatus which has the display unit 16 and the projector 18 merely displays an image using one of the display unit 16 and the projector 18, and there is no technical concept of handling the display screen and the projection surface S as one display area as in the present exemplary embodiment. Consequently, according to this display processing, by utilizing the display screen and the projection surface S together, it is possible to realize a display system of improved convenience than display systems in the past.

In addition, although it has been described above that a projection image is projected while expanding the projection area when the drag operation is performed on the touch panel 22 after the contact sensor 24 detects contact of the bottom surface 10a, the present disclosure is not limited to this. For example, when contact of the bottom surface 10a is detected, the projection area may be expanded irrespectively of whether or not the drag operation is performed. Further, according to the direction of the drag operation, the projection area may be changed to the projection area which the user desires. By this means, it is possible to project the projection image on the projection surface S with an optimal projection area.

6. Second Exemplary Embodiment of Display Processing of Image P1 and Projection Image P2

Figure 8:
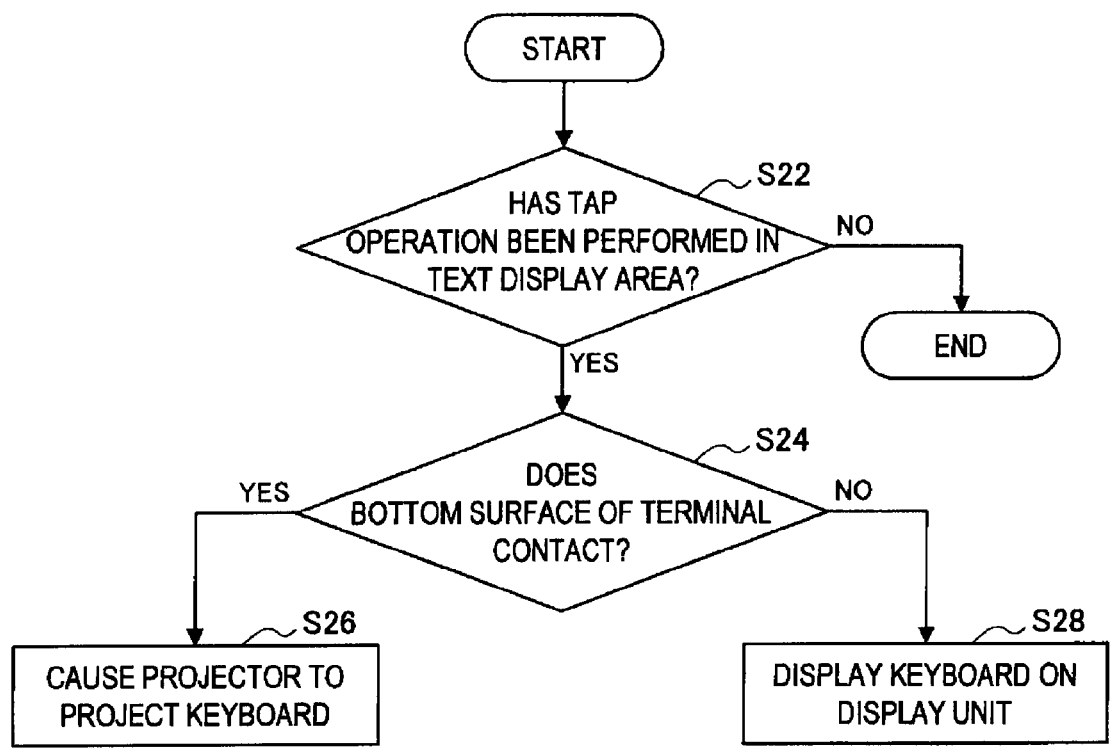
FIG. 8 is a flowchart for explaining a second exemplary embodiment of display processing of the image P1 and the projection image P2.

The second exemplary embodiment of display processing of the image P1 and the projection image P2 will be explained using FIG. 8. FIG. 8 is a flowchart for explaining the second exemplary embodiment of display processing of the image P1 and the projection image P2.

The second exemplary embodiment relates to display processing when a text display area is displayed on the display unit 16 as the image P1 as shown in FIG. 4. Further, display processing according to the second exemplary embodiment is started in a state where the text display area (image P1) is displayed on the display unit 16 and the projector 18 does not perform projection.

First, the controlling unit 30 decides whether or not the user performs a tap operation on the text display area in a state where the text display area is displayed on the display unit 16 (step 22). Further, when deciding that the tap operation is not performed (step S22: No), the controlling unit 30 finishes this processing without projecting the image P2 on the projection surface S.

By contrast with this, when the controlling unit 30 decides that the tap operation is performed (step S22: Yes), the contact sensor 24 subsequently decides whether or not the bottom surface 10a of the mobile terminal 10 contacts another object (for example, the table T) (step S24).

Further, when the controlling unit 30 decides that the bottom surface 10a does not contact the table T (step S24: No), the keyboard (not illustrated) is displayed on the display unit 16 (step S28). That is, the display unit 16 displays both of the text display area and the keyboard. Consequently, by touching the keyboard of the display unit 16, texts can be input in the text display area. In addition, in this case, the size of the text display area of the display unit 16 becomes small inversely proportionally to the displayed keyboard.

By contrast with this, when deciding that the bottom surface 10a contacts the table T (step S24: Yes), the controlling unit 30 causes the projector 18 to project the image P2 showing a virtual keyboard shown in FIG. 4, on the projection surface S without changing the size of the text display area of the display unit 16 (step S26). Here, the image P2 is projected to be adjacent to the bottom surface 10a similar to the first exemplary embodiment.

According to display processing of this second exemplary embodiment, by projecting the image P2 showing the virtual keyboard on the projection surface S when the text display area is displayed on the display unit 16, the user can input texts in the text display area by performing touch control on the image P2 of the virtual keyboard. Consequently, compared to when there is the text display area and the keyboard area in the display screen, the text display area can be displayed larger, so that convenience of the mobile terminal 10 improves.

In addition, although the projection area of the image P2 is projected while gradually expanding the projection area in the first exemplary embodiment, the image P2 is projected on the projection surface S instantly in the second exemplary embodiment. By this means, it is possible to quickly input texts while maintaining a wide text display area.

7. Example of Scroll Display of Image P1 and Projection Image P2

Scroll display of the image P1 and the projection image P2 will be explained with a specific example in a state where the image P1 is displayed on the display unit 16 and the projection image P2 is projected on the projection surface S.

Figure 9:
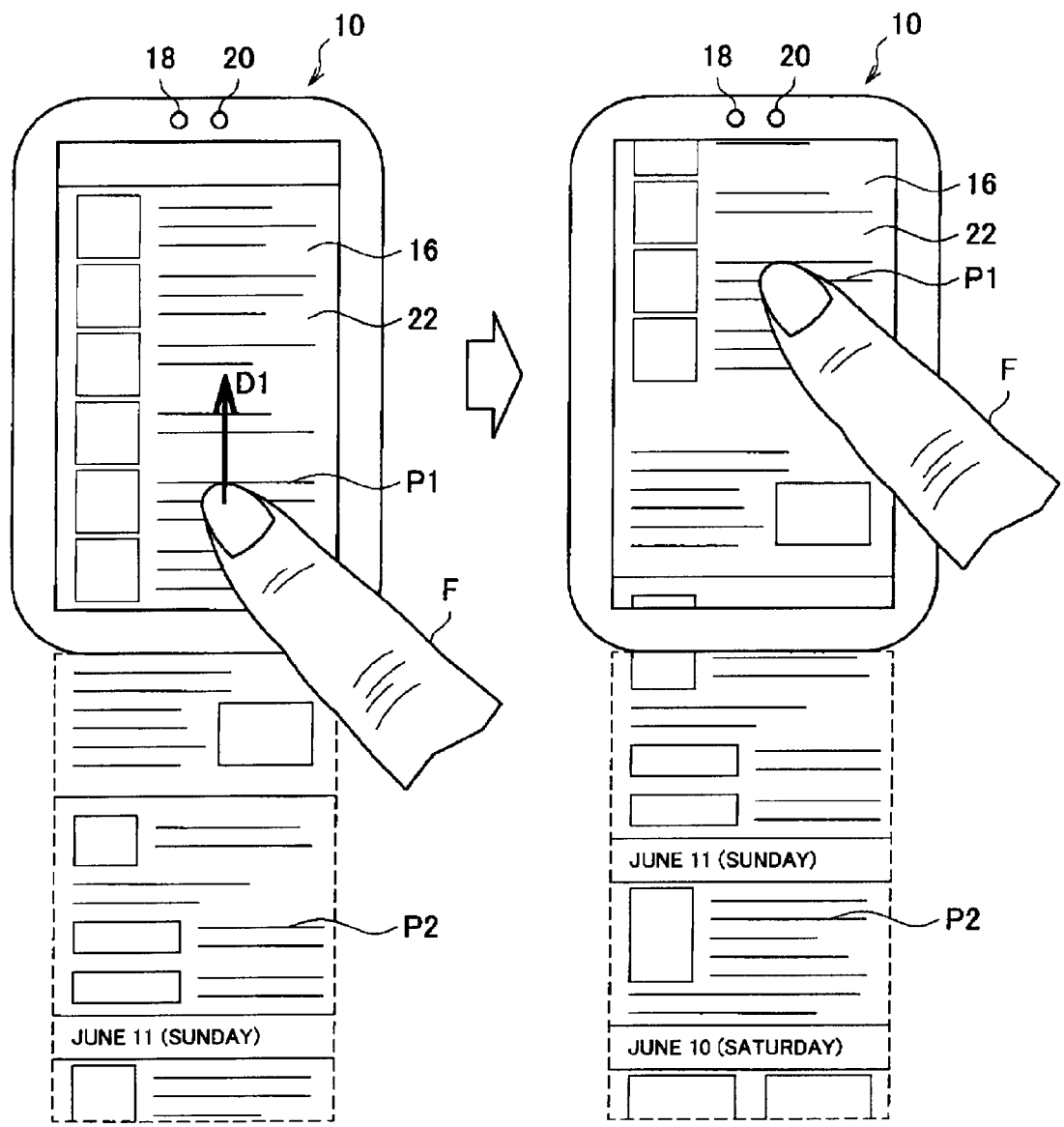
FIG. 9 is a view for explaining how the image P1 and the projection image P2 scroll in conjunction with a drag operation on a touch panel 22.

FIG. 9 is a view for explaining how the image P1 and the projection image P2 scroll in conjunction with a drag operation on the touch panel 22. The left drawing of FIG. 9 shows the state before the image is scrolled, and the right drawing shows the state after the image is scrolled. In addition, the direction D1 of the arrow indicates the drag direction.

As shown in FIG. 9, by dragging in the direction D1 in a state where the finger F touches the touch panel 22, the image P1 of the display unit 16 and the projection image P2 of the projection surface S move in the direction D1. By this means, part of the image which is displayed as the projection image P2 before scrolling is displayed on the display unit 16. As described above, by performing a drag operation on the touch panel 22, not only the image P1 of the display unit 16 but also the projection image P2 moves. As a result, it is possible to easily scroll the two images P1 and P2 with a simple operation.

Figure 10:
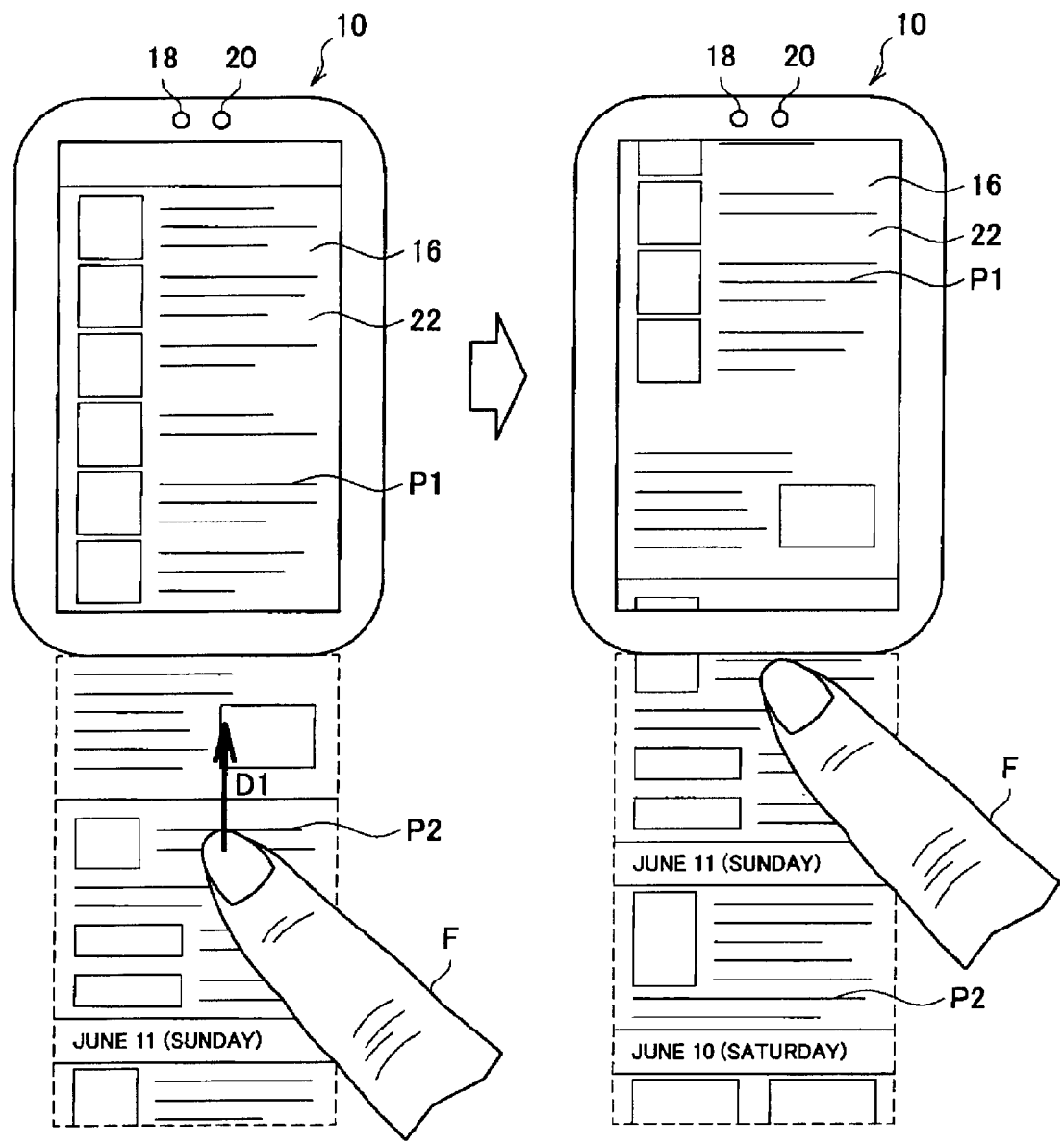
FIG. 10 is a view for explaining how the image P1 and the projection image P2 scroll in conjunction with a moving operation of the finger on the projection image P2.

FIG. 10 is a view for explaining how the image P1 and the projection image P2 scroll in conjunction with a moving operation of the finger on the projection image P2. The left drawing of FIG. 10 shows the state before the image is scrolled, and the right drawing shows the state after the image is scrolled. In addition, the direction D1 of the arrow indicates the moving direction of the finger F.

The camera 20 detects movement of the finger F. That is, the camera 20 corresponds to an example of a movement detecting unit. Further, as illustrated in FIG. 10, when the user's finger F moves on the projection image P2 in the direction D1, the image P1 on the display unit 16 and the projection image P2 on the projection surface S move in the direction D1. By this means, part of the image which is displayed as the projection image P2 before scrolling is displayed on the display unit 16. Thus, by moving the finger on the projection image P2, not only the projection image P2 but also the image P1 of the display unit 16 moves. As a result, it is possible to easily scroll the two images P1 and P2 with a simple operation.

Figure 11:
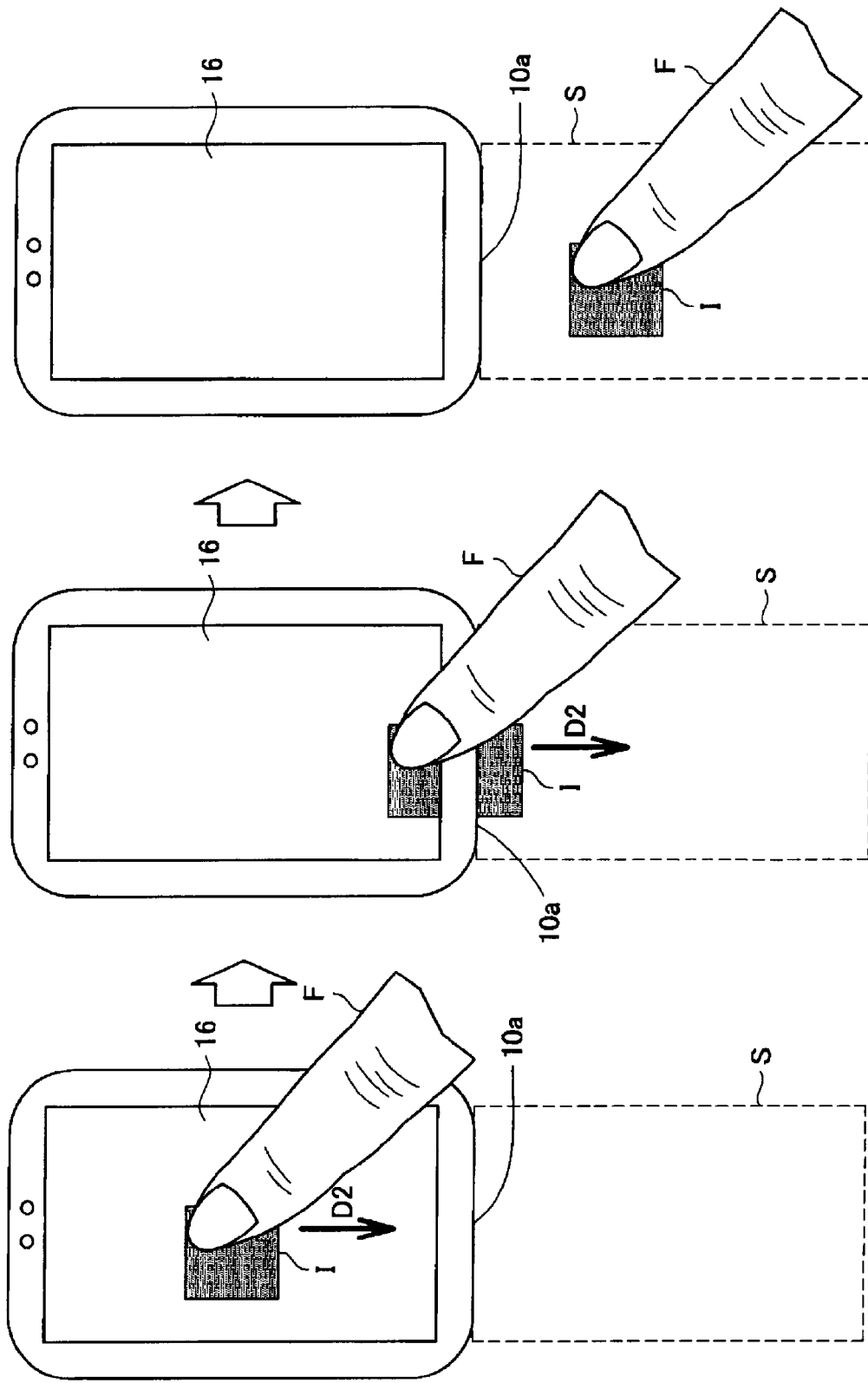
FIG. 11 is a view for explaining how an icon I on a display screen of the display unit 16 moves to the projection surface S in conjunction with a drag operation.

FIG. 11 is a view for explaining how an icon I on a display screen of the display unit 16 moves to the projection surface S in conjunction with a drag operation. In addition, the direction D2 of the arrow indicates the drag direction.

As illustrated in FIG. 11, by continuously dragging the icon I in the direction D2 in a state where the icon I is touched by the finger F on the display screen of the display unit 16, the icon I moves to the projection surface S and is displayed as part of the projection image. In addition, as shown in the middle of FIG. 11, when the icon I steps over both of the display screen and the projection surface S while the icon I is moving, the icon I is displayed separately on the display screen and the projection surface S. As described above, the icon on the display screen moves to the projection surface S in conjunction with a series of touch operations from the display screen to the projection surface S and moving operation of the finger. As described above, it is possible to perform a drag operation of the icon between the display screen and the projection surface S of respectively different surfaces with a simple operation.

Here, a method of realizing a continuous touch operation when the display screen and the projection surface S of the display unit 16 are displayed as a continuous display area will be explained using FIG. 12. FIG. 12 is a schematic diagram for explaining integrated coordinate space when the display screen and the projection surface of the display unit 16 are regarded as a continuous display area.

FIG. 12(a) shows a coordinate area of a display screen E of the display unit 16. The coordinate of the display screen E in the width direction is 0 to WL, and the coordinate in the height direction is 0 to HL. In addition, the upper left end of the display screen E is the point of origin. FIG. 12(b) shows the coordinate area of the projection surface S. The coordinate of the projection surface S in the width direction is 0 to WP, and the coordinate in the height direction is 0 to HP. In addition, the upper left end of the projection surface S is the point of origin. FIG. 12(c) shows integrated coordinate space integrating the display screen E and projection surface S.

The method of calculating the touch position in the integrated space coordinate shown in FIG. 12(c) will be explained. The integrated coordinate (X, Y) in the integrated space coordinate will be found from the following three constants SL, H1 and SP. First, the three constants will be determined as in the following expressions (i.e., expression 1 to expression 3).

$$SL = W/WL \quad (1)$$

$$H1 = HL/SL \quad (2)$$

$$SP = W/WP \quad (3)$$

Here, W is a random positive fixed value (maximum X coordinate of the integrated coordinate space).

Then, the integrated coordinate (X, Y) on the display screen E will be represented by the following expressions (i.e., expression 4 and expression 5).

$$X = XL * SL \quad (4)$$

$$Y = YL * SL \quad (5)$$

Further, the integrated coordinate (X, Y) on the projection surface S is represented by the following expressions (i.e., expression 6 and expression 7).

$$X = XP * SP \quad (6)$$

$$Y = YP * SP + H1 \quad (7)$$

8. Other Exemplary Embodiments

It should be understood by those skilled in the art that various modifications, combinations, sub-combinations and alterations may occur depending on design requirements and other factors insofar as they are within the scope of the appended claims or the equivalents thereof.

Although, in the above exemplary embodiments, when it is detected that the mobile terminal 10 contacts the table T, the projection image P2 is projected on the projection surface S, the present disclosure is not limited to these examples. For example, when it is detected that the mobile terminal 10 comes close to the table T, the projection image P2 may be projected on the projection surface S.

Figure 13:
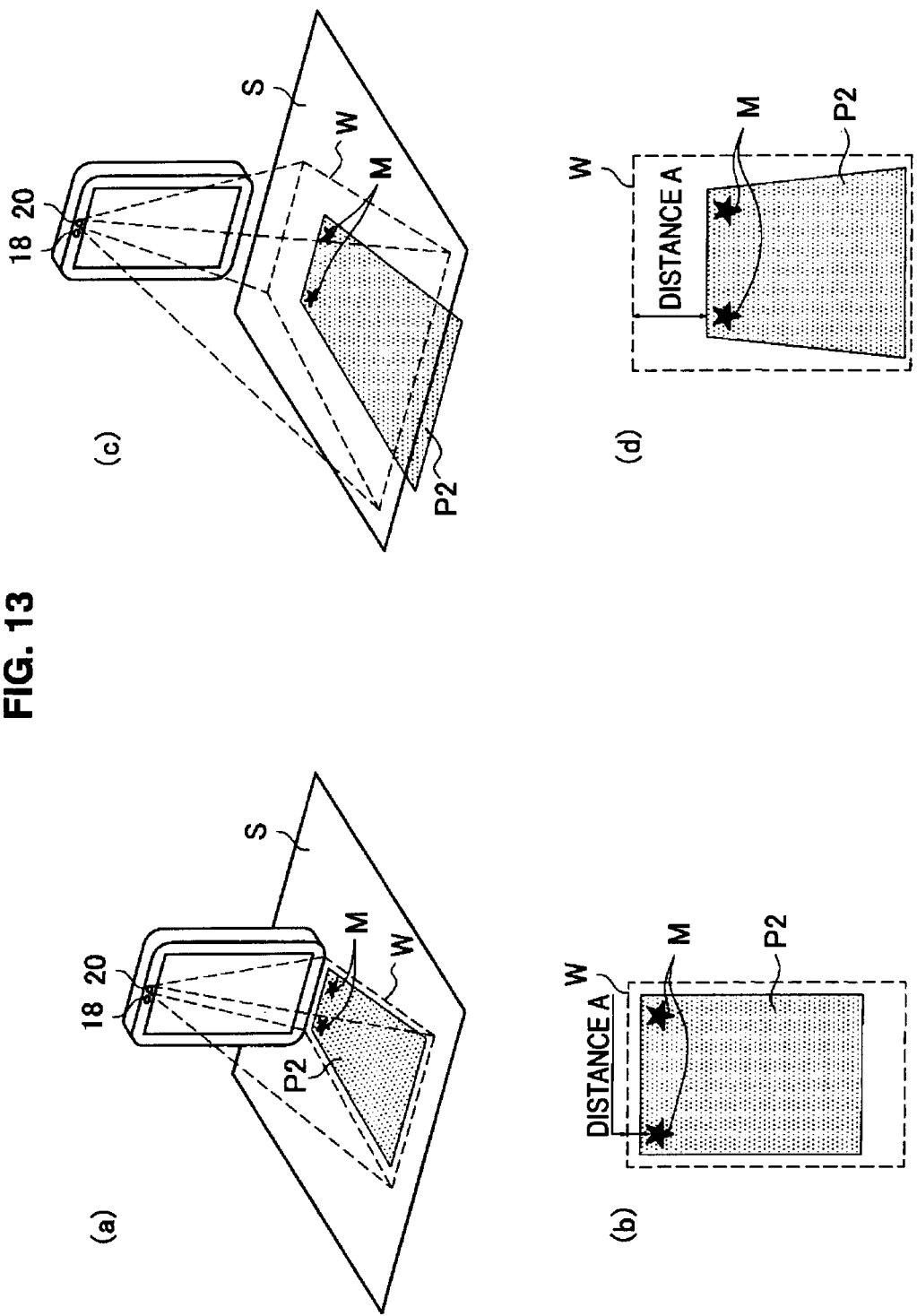
FIG. 13 is a schematic diagram explaining a method of detecting that the mobile terminal 10 comes close to the projection surface S.

FIG. 13 is a schematic diagram showing a method of detecting that the mobile terminal 10 comes close to the projection surface S. According to this method, after a mark M of an identification image is projected on the projection surface S, an image of the projected mark M is taken by the camera 20. Further, it is possible to decide whether or not the mobile terminal 10 comes close to the table T based on the position of the mark M an image of which is taken by the camera 20 corresponding to the reading unit.

For example, when the mobile terminal 10 comes close to the projection surface S as shown in FIG. 13(a), the position of the mark M an image of which is taken by the camera 20 is positioned close to the upper side of the image taking area W of the camera 20 as shown in FIG. 13(b). By contrast with this, when the mobile terminal 10 is spaced apart from the projection surface S as in FIG. 13(c), the position of the mark M an image of which is taken is positioned spaced apart from the upper side of the image taking area W as shown in FIG. 13(d). According to this method, the contact sensor 24 is unnecessary, so that it is possible to simplify the apparatus. In addition, the shapes of the projection images P2 in FIGS. 13(b) and 13(d) are different because, while the optical axes of the camera 20 and the projector 18 substantially match in FIG. 13(b), the optical axes of the camera 20 and the projector 18 are misaligned in FIG. 13(d).

Figure 14:
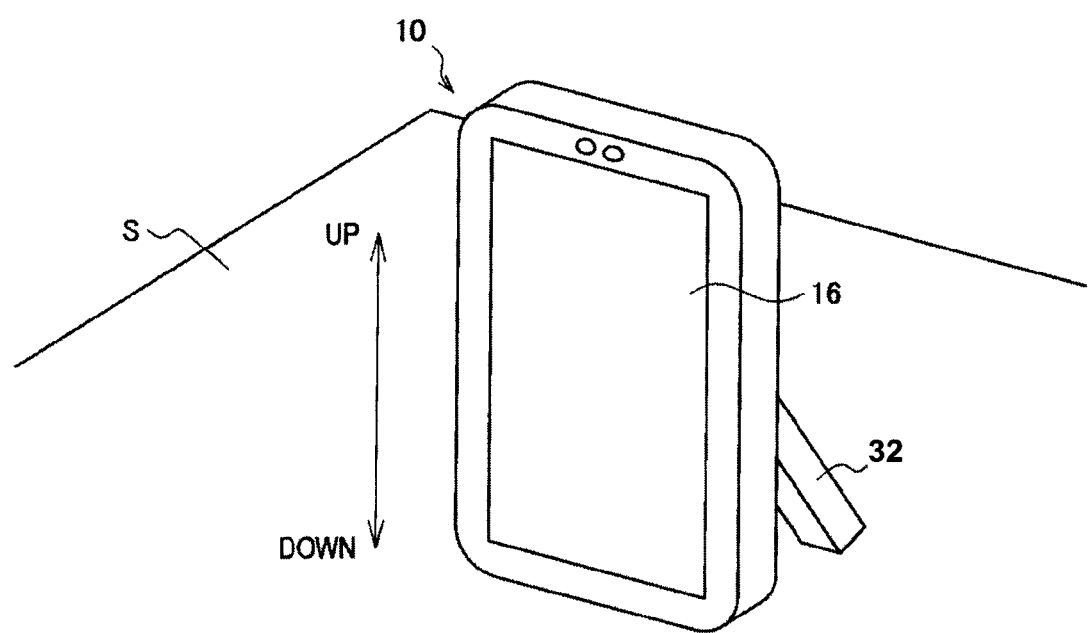
FIG. 14 is a view showing other exemplary embodiment of detecting contact of the mobile terminal 10.

Further, although, in the above exemplary embodiments, the contact sensor 24 provided in the bottom surface 10a of the mobile terminal 10 detects that the mobile terminal 10 contacts the table T, the present disclosure is not limited to these examples. For example, as shown in FIG. 14, contact may be detected based on the rotation angle of a support axis 32 rotatably provided in the mobile terminal 10. Although this support axis 32 is accommodated in the mobile terminal 10 when the mobile terminal 10 is carried, the support axis 32 is rotated when the mobile terminal 10 is set on the table T or the like. Consequently, by setting the rotation axis of the support axis 32 when the mobile terminal 10 is set on the table, it is possible to detect the rotation angle of the support axis 32 and detect contact of the mobile terminal 10. In addition, FIG. 14 is a view showing other exemplary embodiment where contact of the mobile terminal 10 is detected.

In addition, even when the bottom surface 10a of the mobile terminal 10 does not contact or come close to the table T, the projection image P2 related to the image P1 displayed on the display unit 16 may be projected on the projection surface S. For example, when an operation of shaking the mobile terminal 10 is performed while the image P1 is displayed, the projection image P2 may be projected. Further, when an e-mail is received, contents of the e-mail may be projected on the projection surface S as the projection image P2.

Further, although, in the above exemplary embodiments, movement of the finger on the projection image P2 is detected by the camera 20, the present disclosure is not limited to the examples. For example, when the projector 18 adopts the laser scan system, the reflex of the finger with respect to laser may be detected.

Further, although, in the above exemplary embodiments, the mobile terminal 10 has been explained as an example of an information processing apparatus, the present disclosure is not limited to these examples. For example, an apparatus which is fixed on, for example, a table to use such as a digital photo frame may be possible.

The present disclosure contains subject matter related to that disclosed in Japanese Priority Patent Application JP 2010-181759, filed in the Japan Patent Office on Aug. 16, 2010, the entire contents of which is hereby incorporated by reference.

What is claimed is:

1. An information processing device, comprising:
   a housing;
   a display unit configured to display, on a display screen, at least a first portion of a content; and
   a projection unit configured to project at least a second portion of the content onto a projection surface by emitting a beam of light onto the projection surface,
   wherein the second portion of the content is projected onto the projection surface provided as an extension of a display area of the display screen, to present an image of the content spanning from the display screen to the projection surface and having the at least the second portion of the content displayed on the projection surface to be substantially contiguous with the at least the first portion of the content displayed on the display screen, and
   wherein the display unit and the projection unit are each implemented via at least one processor.

2. The information processing device of claim 1, wherein the content is associated with an electronic document.

3. The information processing device of claim 1, further comprising a control unit configured to generate a first instruction to display the first portion of the content to the user, and a second instruction to project the second portion of the content onto the projection surface.

4. The information processing device of claim 3, further comprising a sensor unit configured to generate a signal indicative of a contact between an operational tool of a user and a surface of the sensor unit, the sensor unit being in communication with the control unit.

5. The information processing device of claim 4, wherein the operational tool comprises a human appendage.

6. The information processing device of claim 4, wherein the control unit is further configured to:
receive the signal from the sensor unit; and
identify a first contact position associated with the contact, based on at least the signal.

7. The information processing device of claim 6, wherein the control unit is further configured to identify a movement of the first contact position.

8. The information processing device of claim 7, wherein the control unit is further configured to:
shift the display of the first portion of the content on the display screen and shift the display of the second portion of the content on the projection surface, based on at least the movement of the first contact position.

9. The information processing apparatus of claim 8, wherein the control unit is further configured to:
determine a direction associated with the movement of the first contact position; and
shift the display of the first portion and the second portion, based on the movement of the first contact position and the direction.

10. The information processing device of claim 3, wherein
a contact is detected between an operational tool of a user and the projection surface; and
a position associated with the detected contact is identified.

11. The information processing device of claim 10, wherein the control unit is further configured to identify a movement of the detected contact.

12. The information processing device of claim 11, wherein the control unit is further configured to:
shift the display of the first portion of the content on the display screen and shift the display of the second portion of the content on the projection surface, based on at least the movement of the contact position.

13. The information processing device of claim 12, wherein the control unit is further configured to:
determine a direction associated with the movement of the contact position; and
shift the display of the first portion of the content on the display screen and shift the display of the second portion of the content on the projection surface, based on the movement of the contact position and the direction.

14. The information processing device of claim 1, further comprising:
a detection unit configured to determine whether a portion of the housing is in contact with the projection surface; and
the projection unit is further configured to project the second portion of the content onto the projection surface, when the portion of the housing is in contact with the projection surface.

15. A computer-implemented method for processing information, comprising:
displaying, on a display screen, at least a first portion of a content; and
projecting at least a second portion of the content onto a projection surface by emitting a beam of light onto the projection surface,
wherein the second portion of the content is projected onto the projection surface provided as an extension of a display area of the display screen, to present an image of the content spanning from the display screen to the projection surface and having the at least the second portion of the content displayed on the projection surface to be substantially contiguous with the at least the first portion of the content displayed on the display screen.

16. A non-transitory, computer-readable storage medium storing a program that, when executed by a processor, causes a processor to perform a method for processing information, comprising:
displaying, on a display screen, at least a first portion of a content; and
projecting at least a second portion of the content onto a projection surface by emitting a beam of light onto the projection surface,
wherein the second portion of the content is projected onto the projection surface provided as an extension of a display area of the display screen, to present an image of the content spanning from the display screen to the projection surface and having the at least the second portion of the content displayed on the projection surface to be substantially contiguous with the at least the first portion of the content displayed on the display screen.

17. The information processing device of claim 1, wherein, when a drag-and-drop gesture is input with a drag-starting point on a surface of the display screen corresponding to a location at which an icon is displayed on the display screen and a drop point corresponding to a location on the projection surface, the icon is displayed to be dragged from the display screen of the display unit across to the projection surface and dropped at the drop point onto the second portion of the content projected onto the projection surface by the projection unit according to a motion of the drag-and-drop gesture.

18. The information processing device of claim 1, further comprising:
a touch panel provided in correspondence with the display screen,
wherein, in accordance with a gesture provided across a surface of the touch panel, both the display of the first portion of the content and the projection of the second portion of the content are displayedly scrolled in conjunction along a direction of the drag gesture.

19. The information processing device of claim 1, wherein, in accordance with a gesture provided across the projection surface, both the projection of the second portion of the content and the display of the first portion of the content are displayedly scrolled in conjunction along a direction of the drag gesture.

20. The information processing device of claim 1, wherein, in accordance with a gesture provided across a surface of the touch panel in a direction towards the projection surface, the first portion of the content displayed on the display screen is displayedly scrolled towards the projection surface and a part of the first portion of the content is transitioned from being displayed on the display screen to being projected onto the projection surface.

21. The information processing device of claim 1, wherein the projection unit projects the second portion of the content onto the projection surface at a location adjacent to an edge of the display screen, and wherein the first portion of the content and the second portion of the content taken together form a continuous image.

22. The information processing device of claim 1, wherein the content is one of a single web page, a single image, and a graphical user interface of an executed application.

\* \* \* \* \*